United States Patent
Esibov et al.

(10) Patent No.: US 6,701,329 B1
(45) Date of Patent: Mar. 2, 2004

(54) AGING AND SCAVENGING OF DNS RESOURCE RECORDS

(75) Inventors: Levon A. Esibov, Redmond, WA (US); Stuart L. S. Kwan, Redmond, WA (US); Eyal Schwartz, Bellevue, WA (US); James M. Gilroy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 09/661,480

(22) Filed: Sep. 14, 2000

(51) Int. Cl.$^7$ ............................................... G06F 17/30
(52) U.S. Cl. ...................................... 707/201; 709/226
(58) Field of Search ............................... 707/200–206, 707/10; 709/203, 245, 223

(56) References Cited

U.S. PATENT DOCUMENTS

| | | | | | |
|---|---|---|---|---|---|
| 6,016,512 | A | * | 1/2000 | Huitema | 709/245 |
| 6,092,091 | A | * | 7/2000 | Sumita et al. | 715/530 |
| 6,311,060 | B1 | * | 10/2001 | Evans et al. | 455/426.1 |
| 6,317,604 | B1 | * | 11/2001 | Kovach et al. | 455/456.5 |
| 6,360,256 | B1 | * | 3/2002 | Lim | 709/223 |

OTHER PUBLICATIONS

Microsoft Windows 2000 Server, (Windows 2000 DNS White Paper), Microsoft Corp., Oct. 18, 1999, pp. 23–28.*
Wellington, Brian et al., "Deferred Dynamic Name System (DNS) Delete Operations", TISLabs, Apr. 1999, http://www.ietf.org/proceedings/99jul/I–D/draft–ietf–dnsind–dddd–01.txt.*
Darling, A., "A top–10 regional university gains an No. 1 solution," *Communications News*, Feb. 2000, 37(2), 22.
Young–Chul, S. et al., "Extension and Design of Secure Dynamic Updates in Domain in Name Systems," *Fifth Asia–Pacific Conference on Communications and Fourth Optoelectronics and Communications Conference, Proceedings APCC/OECC'99*, Conference—Vitality to the New Century, Beijing, China, Oct. 18–22, 1999, 1147–1150.

* cited by examiner

*Primary Examiner*—Patrice Winder
*Assistant Examiner*—Daryl Mastracci
(74) *Attorney, Agent, or Firm*—Woodcock Washburn LLP

(57) ABSTRACT

A method and system for aging and scavenging resource records in a DNS database is provided. DNS resource records that are stored in a DNS database are assigned the timestamps indicating the last time the records were updated. Clients (owners of the resource records) periodically refresh timestamps of the DNS resource records that they registered using standard dynamic DNS update protocol. The DNS server then periodically searches its database for the stale records and deletes them. DNS database zone parameters and DNS server parameters are configured to define when a timestamp for a resource record may be updated, when a resource record may be scavenged (deleted) and which server may perform scavenging of a zone. A non-refresh interval follows the timestamp, a refresh interval follows the non-refresh interval and a scavengable period follows the refresh interval. During the non-refresh interval, an authorized DNS server may neither refresh nor scavenge the associated resource record. During the refresh interval, an authorized DNS server may refresh, but not scavenge the associated resource record. During the scavengable period, the resource record may be scavenged, if the timestamp is not renewed in the meantime. The build up of stale resource records, or records that have outlived their utility, is thus prevented improving system performance and conserving system memory and resources.

34 Claims, 8 Drawing Sheets

FIG. 1 - *Prior Art*

AGING AND SCAVENGING OF DNS RESOURCE RECORDS

FIELD OF THE INVENTION

The present invention relates to Domain Name Service (DNS) servers and the efficient maintenance of resource records in connection with DNS server operations. More particularly, a system and methods are provided for executing a set of computer-readable instructions for aging and scavenging DNS resource records.

BACKGROUND OF THE INVENTION

Although TCP/IP uses IP addresses to locate and connect to hosts (computers and other TCP/IP network devices), users typically prefer to use friendly names. For example, users prefer the friendly name www.example.com, instead of its IP address, Num1.Num2.Num3.Num4, where Num1 through Num4 represent IP addresses. The Domain Name Service (DNS) system is used on the Internet to provide a mapping of the names to IP addresses. For instance, a DNS server may receive requests from networked client computers that wish to connect to a host server offering a desired application or service—such as electronic mail or a search engine—but which do not know the server's IP address. The client computer therefore queries the DNS server, which provides a suitable response depending on the type of information the client requests (e.g., a network address of the desired server).

As shown in FIG. 1, in the case of a request for a host Web page, a user or a client 110 may request an A DNS resource record (that maps a name to an IP address) for a computer name www.example.com, and the DNS server 10 processes the request in connection with a DNS database 20, returning an IP address, such as Num1.Num2.Num3.Num4, corresponding to the computer name requested.

In addition, DNS is used to map names to various types of data specified in the IETF standards. Such data may include, for example, the name of a machine that provides a specific service, the name of a DNS server authoritative for a particular portion (i.e., zone) of a namespace, etc.

The standards and specifications that span DNS are included in the Internet Engineering Task Force's (IETF) Request for Comments (RFC) series, e.g. RFC 1034 and RFC 1035.

Originally, DNS was designed to support only static changes to a zone database, i.e. the addition, removal, or modification of resource records could only be performed by a DNS system administrator. This design is workable when the number of changes is small and updates occur infrequently, but can otherwise become unmanageable. With the introduction of the dynamic host configuration protocol (DHCP), which assumes dynamic change of the IP addresses of the network objects and with fast growth of a DNS database, the DNS database manageability required extension of the DNS protocol to allow dynamic updates. Such extension was defined in IETF RFC 2136.

With dynamic update, on the other hand, the primary server for the zone can also be configured to support updates that are initiated by another computer or device that supports dynamic update. For example, it can receive updates from computers or DHCP servers registering A and PTR resource records. Updates are sent using a standard UPDATE message format and can include the addition or deletion of individual resource records (RRs) or sets of resource records (RRsets), as specified in IETF RFC 2136.

Although it is expected that an entity that registers a resource record in a DNS database will remove such record from DNS database when it becomes stale, there is no mechanism to ensure a limited lifetime of the record in the database. In the nascent stages of a network, such as the Internet, the individual removal of stale, antiquated or obsolete records may not prove to be burdensome. However, as a network, such as the Internet, grows to any scale, performance can be adversely affected by the presence of multiple stale resource records. The proliferation of stale resource records itself is generally correlated to the size of the network being managed, and consequently as a network grows (exponentially as is the case with the Internet), there is an even stronger need for a mechanism to dynamically update resource records in a DNS database, by aging records and scavenging for records aged over a threshold point.

SUMMARY OF THE INVENTION

The present invention relates to methods and a system for aging and scavenging resource records in a DNS database. DNS resource records that are stored in a DNS database are assigned the timestamps indicating the last time the records were updated. Clients (owners of the resource records) periodically refresh timestamps of the DNS resource records that they registered using standard dynamic DNS update protocol. The DNS server then periodically searches its database for the stale records and deletes them. DNS database zone parameters and DNS server parameters are configured to define when a timestamp for a resource record may be updated, when a resource record may be scavenged (deleted) and which server may perform scavenging of a zone. A non-refresh interval follows the timestamp update instance, a refresh interval follows the non-refresh interval and a scavengable period follows the refresh interval. During the non-refresh interval, an authorized DNS server may neither refresh nor scavenge the associated resource record. During the refresh interval, an authorized DNS server may refresh, but not scavenge the associated resource record. During the scavengable period, the resource record may be scavenged, if the timestamp is not renewed in the meantime. The build up of stale resource records, or records that have outlived their utility, is thus prevented improving system performance and conserving system memory and resources.

Other features of the present invention are described below.

BRIEF DESCRIPTION OF THE DRAWINGS

The system and methods for aging and scavenging DNS resource records are further described with reference to the accompanying drawings in which.

DETAILED DESCRIPTION OF PREFERRED EMBODIMENTS

Overview of the Invention

Figure 1:
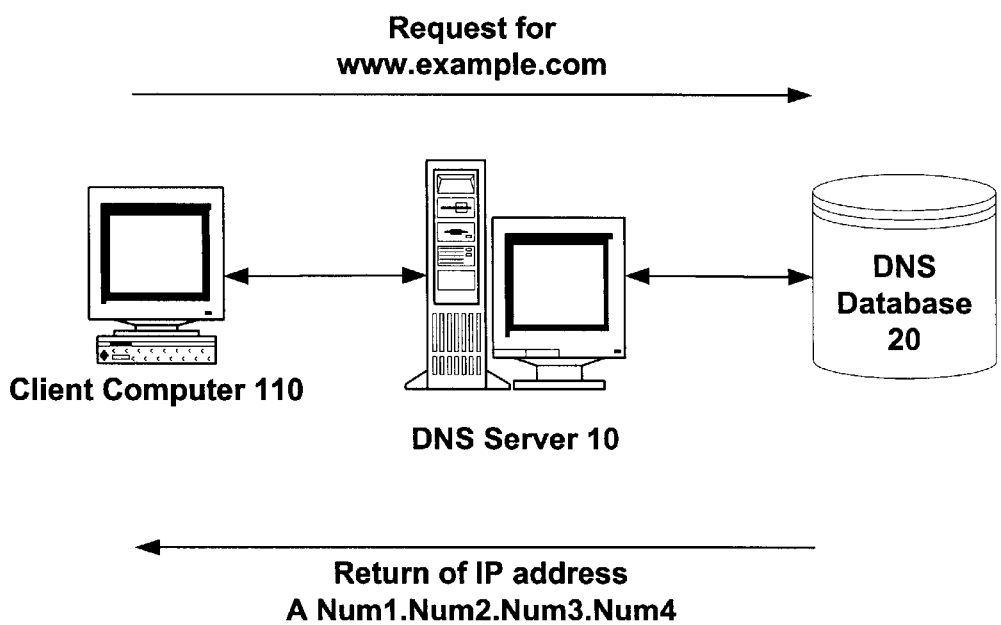
FIG. 1 illustrates a networked client computer making a request to a DNS server computer for a DNS resource record entry in a DNS database.

The present invention relates to the aging and scavenging of records in a database. More particularly the present invention relates to the aging and scavenging of resource records in a DNS database. As part of a process of dynamically updating resource records in a DNS database, a request made to the DNS database from a DNS client computer via a DNS server computer may involve the creation of a new resource record. With current dynamic update systems, a mechanism is provided to dynamically create resource records when needed, and in some instances, to delete such records under certain conditions. However, as mentioned above, some resource records, which have outlived their useful lifetime in the database, nonetheless sometimes escape the deletion mechanism of current dynamic update systems. This can be particularly problematic when the size of a database, such as a DNS database storing resource records, becomes large.

In accordance with the present invention, a timestamp is applied to DNS resource records upon being created or updated in order to measure the relative age of the resource record in a DNS database. Once aged beyond a certain time period, a resource record becomes scavengable i.e., it may be scavenged during a subsequent scavenging process. A no refresh interval is defined, wherein a resource record having a lifetime (current time minus the timestamp) that is less than the no refresh interval can not be refreshed or removed during that time. After the no refresh interval, the lifetime of a resource record enters a refresh interval, wherein a resource record having a lifetime (current time minus timestamp) that is less than the no refresh interval plus the refresh interval but greater than the no refresh interval may be refreshed upon request, for example, from a client computer that originally registered the resource record. After the lifetime of a resource record moves beyond both the no refresh interval and the refresh interval (i.e., the lifetime is greater than the timestamp plus the no refresh interval plus the refresh interval), the resource record becomes scavengable. Once scavengable, a resource record may be scavenged; however, a scavengable resource record may be updated and provided with a new timestamp before scavenging begins beginning the aging process of the resource record again.

These and other aging and scavenging parameters are assigned to zones in the DNS database, for use in connection with DNS servers, which servers also have aging and scavenging parameters assigned to them. A solution to the problem of the proliferation of stale DNS resource records in a DNS database is thus provided.

Overview of DNS System Environments

The present invention relates to DNS systems. The naming system on which DNS is based is a hierarchical and logical tree structure called the DNS namespace. Organizations can also create private networks that are not visible on the Internet, using their own DNS namespaces. The Internet domain namespace runs from the root domain and top-level Internet DNS domains to a specific domain that, for example, has an associated host computer.

The DNS is a distributed database system partitioned into DNS zones. A zone is a contiguous portion of the DNS namespace. A zone may have primary and secondary copies. A primary copy is the copy of the zone to which the updates are made, whereas a secondary copy is a copy of the zone that is replicated from a master server. Although in the original DNS topology there was only one primary copy for a zone, currently there are DNS server implementations that support multiple primary copies of the zone. Every DNS zone contains DNS resource records. A resource record is a mapping of a DNS name to some data and the types of data are specified in the IETF standards.

DNS servers are computers that run DNS server programs. A DNS server can be authoritative for none, one or more zones. DNS servers attempt to resolve client queries. When queried, DNS servers can provide the requested information, provide a pointer to another server that can help resolve the query, or respond that it does not have the information or that the information does not exist.

DNS resolvers are programs that generate DNS queries to query for information from servers. Resolvers can communicate with either remote DNS servers or the DNS server program running on the local computer. Resolvers are usually built into utility programs or are accessible through library functions. A resolver can run on any computer, including a DNS server.

As related in the background, originally, DNS was designed to support only static changes to a zone database, i.e. the addition, removal, or modification of resource records could only be performed by a DNS system administrator. This design is workable when the number of changes is small and updates occur infrequently, but can otherwise become unmanageable. With the introduction of the dynamic host configuration protocol (DHCP), which assumes dynamic change of the IP addresses of the network objects and with fast growth of a DNS database, the DNS database manageability required extension of the DNS protocol to allow dynamic updates. Such extension was defined in IETF RFC 2136.

With dynamic update, on the other hand, the primary server for the zone can also be configured to support updates that are initiated by another computer or device that supports dynamic update. For example, it can receive updates from computers or DHCP servers registering A and PTR resource records. Updates are sent using a standard UPDATE message format and can include the addition or deletion of individual resource records (RRs) or sets of resource records (RRsets), as specified in IETF RFC 2136.

A resource record is a mapping of a DNS name to some information. Each DNS server may contain the resource records that it uses to answer queries for the portion of the DNS namespace for which it is authoritative. A DNS server is authoritative for a contiguous portion of the DNS namespace if it contains information about that portion of the namespace.

A zone contains the resource records for the names that belong to the portion of a DNS namespace enclosed by the zone scope. In some DNS implementations, zones are implemented as text files, although zone storage formats are not so limited.

Figure 2:
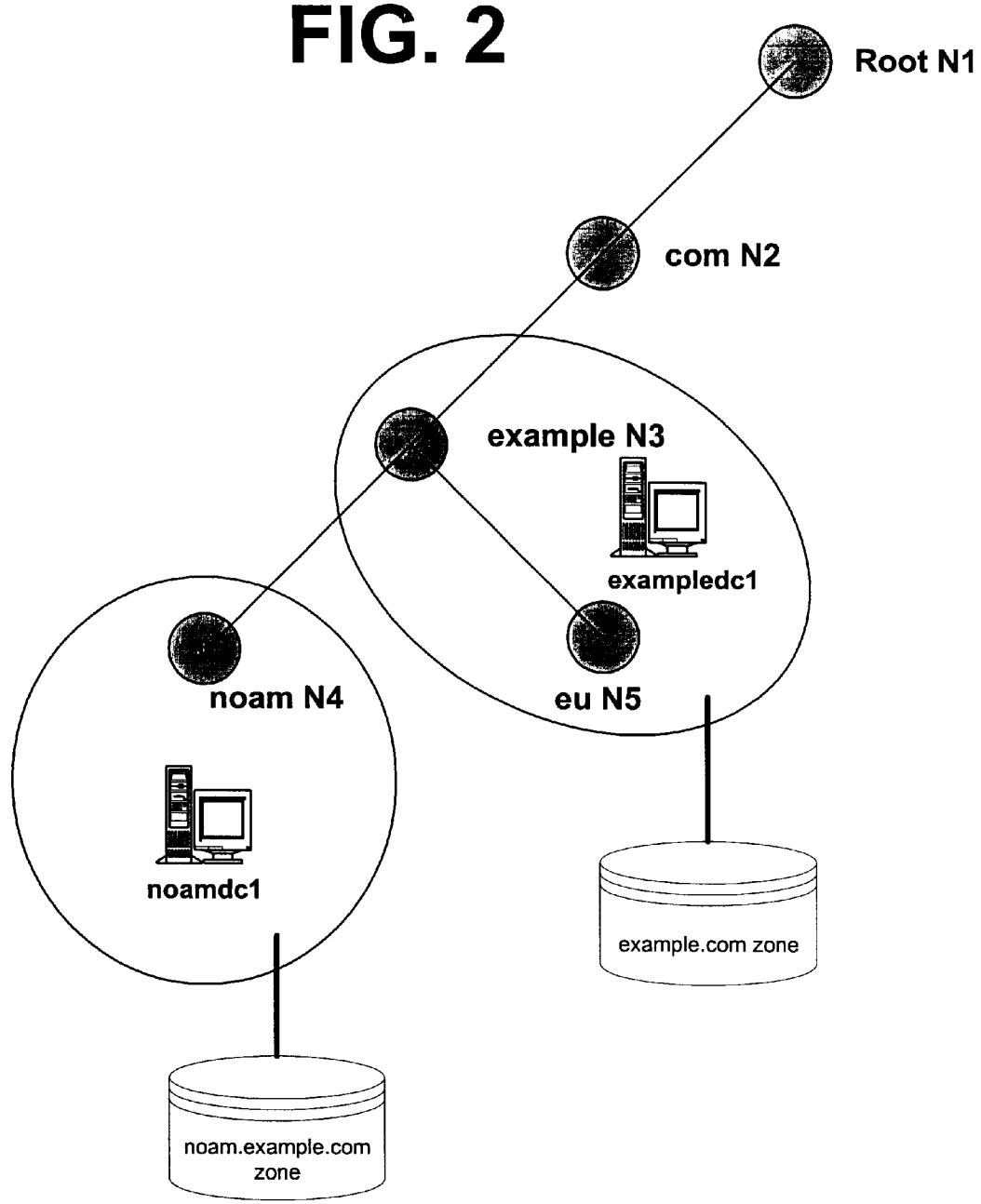
FIG. 2 is a hierarchical diagram illustrative of aspects of a DNS environment in accordance with the present invention.

FIG. 2 shows an example of a DNS domain that contains two zones. In this example, the domain example.com contains two subdomains: noam.example.com and eu.example.com. Authority for the noam.example.com subdomain has been delegated to the server noamdc1.noam.example.com. Thus, as FIG. 2 shows, one server, noamdc1.noam.example.com, hosts the noam.example.com zone, and a second server, exampledc1.example.com, hosts the example.com zone that includes the eu.example.com subdomain. Rather than delegating the noam.example.com zone to noamdc1.noam.example.com, the administrator can also configure exampledc1 to host the zone for noam.example.com. Thus, there is flexibility in assigning servers to zones.

A single DNS server may be configured to manage none, one or multiple zones and multiple zones may be created to distribute administrative tasks to different groups and to provide efficient data distribution. Also, the same zone can be stored on multiple servers to provide load balancing and fault tolerance.

As mentioned, DNS servers may store information about no zones, one zone, or multiple zones. When a DNS server receives a DNS query, it attempts to locate the requested information by retrieving data from its local zones. If this fails because the server is not authoritative for the DNS domain requested and thus does not have the data for the requested domain, the server can check its cache, communicate with other DNS servers to resolve the request, or refer the client to another DNS server that might know the answer.

DNS servers can host primary and secondary zones. Servers may be configured to host as many different primary or secondary zones as is practical, which means that a server might host the primary copy of one zone and the secondary copy of another zone, or it might host only the primary or only the secondary copy for a zone. For each zone, the server that hosts the primary zone is considered the primary server for that zone, and the server that hosts the secondary zones is considered the secondary server for that zone.

When a change is made to the zone data, such as delegating a portion of the zone to another DNS server or adding resource records in the zone, these changes must be made on the primary DNS server for that zone.

In contrast, secondary zones are replicated from another server. When a zone is defined on a secondary server for that zone, the zone is configured with the IP address of the server from which the zone is to be replicated. The server from which the zone replicates can either be a primary or secondary server for the zone, and is called a master server for the secondary zone.

When a secondary server for the zone starts up, it contacts the master server for the zone and initiates a zone transfer. The secondary server for the zone also periodically contacts the master server for the zone to see whether the zone data has changed. If so, it can initiate a transfer of the zones, referred to as a zone transfer. Each zone has a primary server. Additionally, each zone ought to have at least one secondary server. Otherwise, if the primary server for the zone goes down, no one will be able to resolve the names in that zone. When a secondary server is configured for a zone, clients can still resolve names for that zone even if the primary server for the zone goes down. Generally, the primary and secondary servers for the zone are installed on different subnets. Therefore, if connectivity to one subnet is lost, DNS clients can still direct queries to the name server on the other subnet.

Furthermore, a secondary server can be added for a zone in a remote location that has a large number of clients, and then the client may be configured to try those servers first. This can prevent clients from communicating across slow links for DNS queries. The secondary server can also answer queries for the zone, reducing the number of queries the primary server for the zone must answer.

Further details on DNS systems may be found in the 3rd edition of "DNS and BIND," by Paul Albitz and Cricket Liu and in the documents of the DNSEXT working group within IETF.

Exemplary Computer and Network Environments

Figure 3:
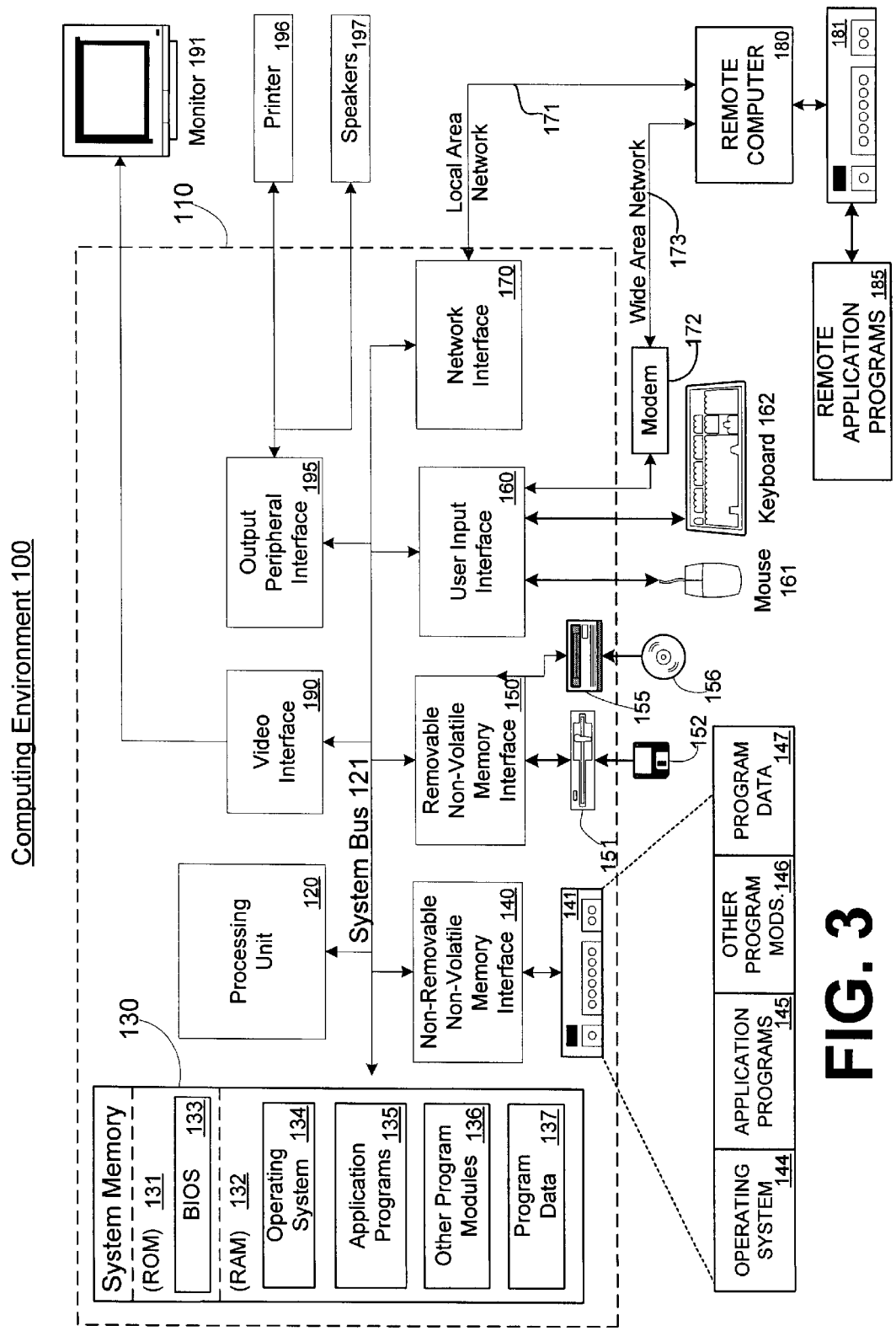
FIG. 3 is a block diagram representing a suitable computing system environment in which the present invention may be implemented.

FIG. 3 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 3 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Figure 4:
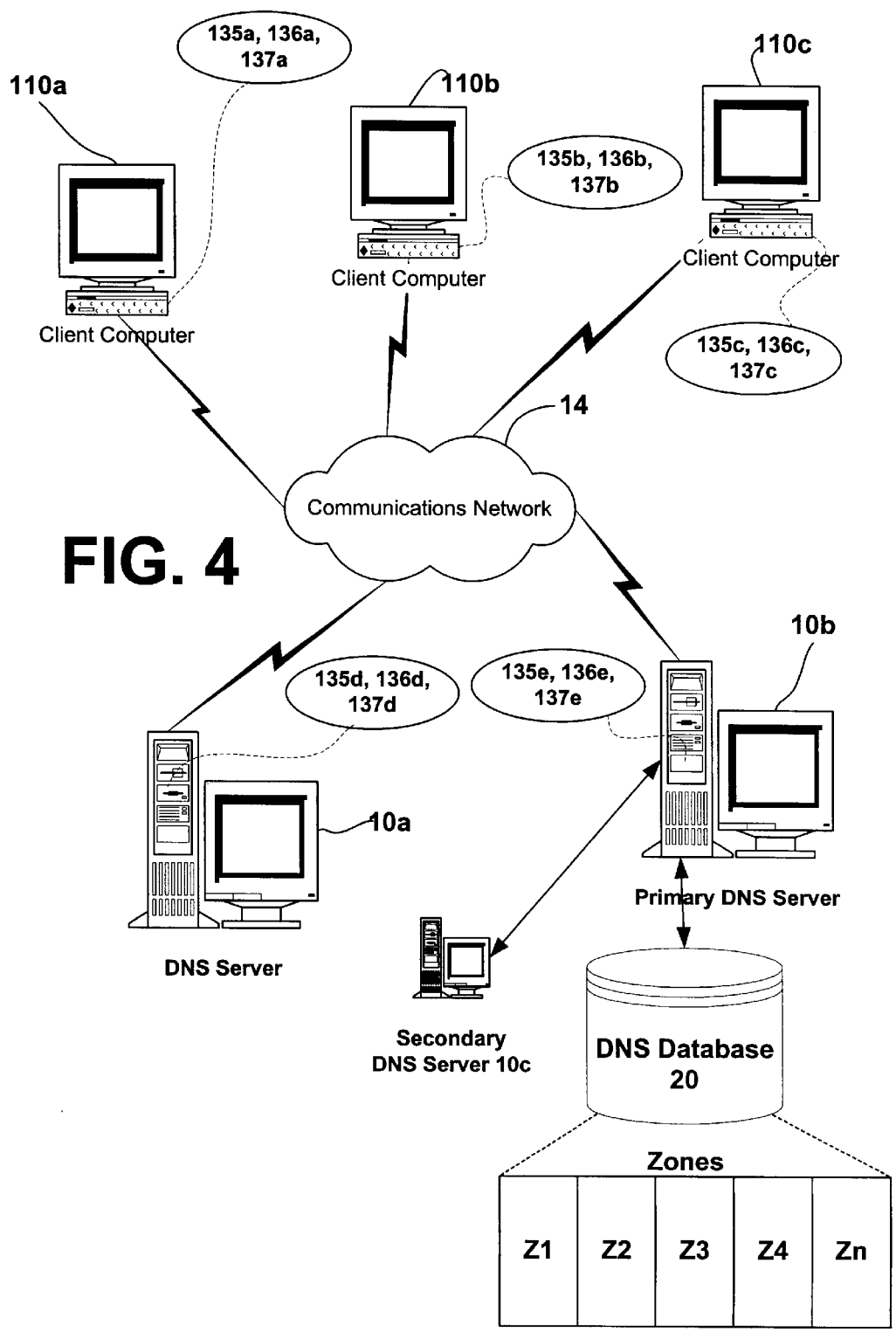
FIG. 4 is a block diagram representing an exemplary network environment in which the present invention may be implemented.

As mentioned, a computer, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. FIG. 4 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, the servers 10 can be Web servers with which the clients 110a, 110b, etc. communicate via any of a number of known protocols such as hypertext transfer protocol (HTTP). Each client computer 110 and server computer 10 may be equipped with various application program modules 135, other program modules 136 and program data 137, and with connections or access to various types of storage elements or objects, across which files may be stored or to which portion(s) of files may be downloaded or migrated. As mentioned, both primary 10b and secondary DNS servers 10c may exist in such a networked environment, and operate according to the standards and protocols of the DNS system. Any DNS server 10a, 10b, etc. may be responsible for the maintenance and updating of a DNS database 20 in accordance with the present invention. As noted above, DNS databases may be divided into any number of zones, such as zones Z1 to Zn. Thus, the present invention can be utilized in a computer network environment having client computers for accessing and interacting with a DNS network and DNS server computers 10a, 10b, etc. for interacting with client computers.

Aging and Scavenging of DNS Resource Records

In accordance with the present invention, an improved technique for removing stale resource records is provided. DNS resource records that are stored in a DNS database are assigned the timestamps indicating the last time the records were updated or refreshed. Clients (owners of the resource records) periodically refresh timestamps of the DNS resource records that they registered using standard dynamic DNS update protocol. The DNS server then periodically searches its database for the stale records and deletes them. The record is pronounced stale if the sum of its timestamp and the configured time interval is greater than the current time on the server. The configured time interval may be further broken down into sub-intervals.

In accordance with the present invention, a DNS server uses the timestamp assigned to each record, as well as other configurable parameters, to determine when a record may be scavenged. For example, parameters that are assigned to a zone include the no refresh interval, the refresh interval, enable scavenging flag, scavenging servers parameter and start scavenging parameter. Other DNS server-specific parameters affect when records are scavenged.

As for the zone parameters, the no refresh interval is the time during which the DNS server will not accept refreshes for the record, although the DNS server will accept updates. The no refresh interval may be viewed as the interval between the last time a record was refreshed and the earliest moment it can be refreshed again. The refresh interval begins after the no refresh interval ends. At the beginning of the refresh interval, the server begins accepting refreshes. After the refresh interval expires, the DNS server can scavenge records that have not been refreshed during or after the refresh interval. The enable scavenging flag indicates whether aging and scavenging is enabled for the zone. The scavenging servers parameter determines which servers can scavenge records in a particular zone. The start scavenging parameter determines when a server can start scavenging in a particular zone.

Default values may be assigned to these parameters for use under certain circumstances. A default no refresh interval may be utilized, for example, when a zone is created. Similarly, a default refresh interval and default enable scavenging flag may be set when a zone is created.

DNS server parameters are also defined in accordance with the present invention. There are defined a default no-refresh interval, a default refresh interval, default enable scavenging flag parameter, an enable scavenging parameter and a scavenging period parameter. The default no-refresh interval is the value that specifies the no-refresh interval that is used by default for the zones created on the DNS server. The default refresh interval is the value that specifies the refresh interval that is used by default for the zones created on the DNS server. The default enable scavenging flag parameter is the value that specifies the enable scavenging parameter that is used by default for the zones created on the DNS server. The enable scavenging parameter is the flag that specifies whether the DNS server can perform scavenging of stale records. If scavenging is enabled on a server, it automatically repeats scavenging as often as specified in the scavenging period parameter. The scavenging period parameter is the period that specifies how often a DNS server enabled for scavenging can remove stale records. For example, the default no-refresh interval, the default refresh interval and the default scavenging period could be assigned a value of 7 days, the default enable scavenging flag could be set to disable scavenging and the enable scavenging flag could be set to disable scavenging. These values are provided as examples only, and it should be understood that any value including zero can be assigned as default values to the parameters of the present invention.

Figure 5:
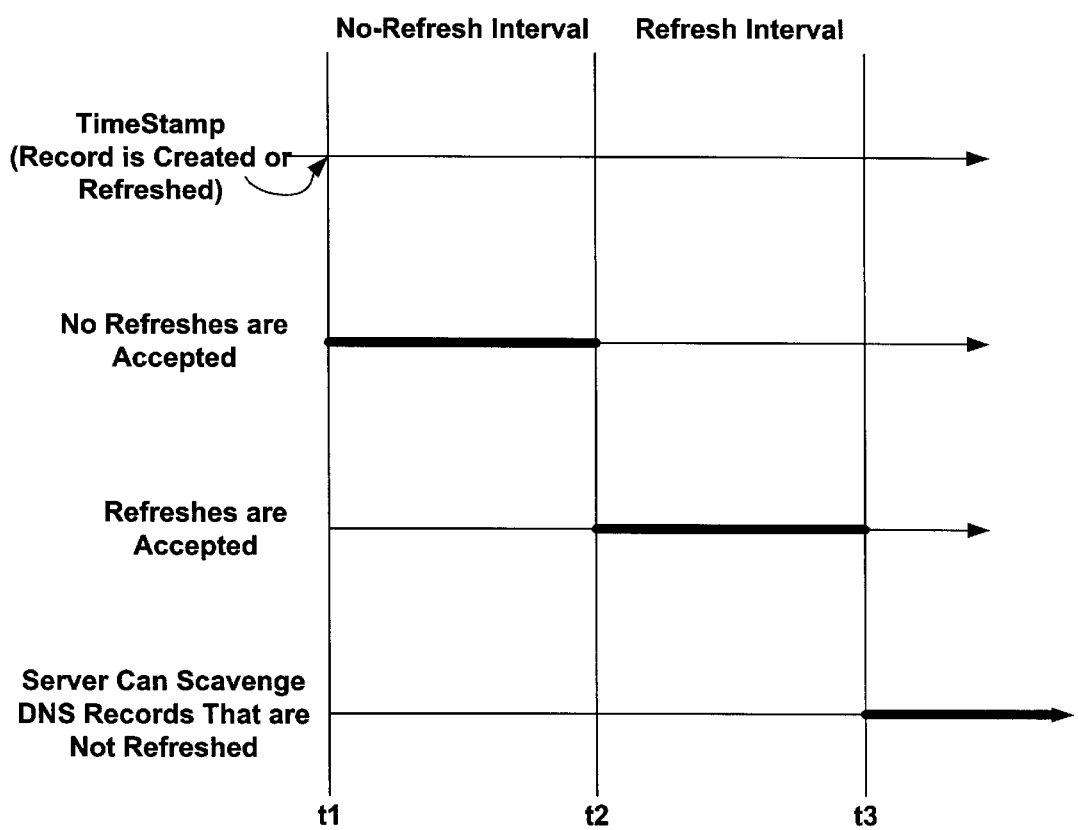
FIG. 5 is a timing diagram illustrating the operation of aging and scavenging parameters defined in accordance with the present invention.

FIG. 5 illustrates an exemplary implementation utilizing the above-described aging and scavenging parameters. When a record is created or refreshed, for example at t1 a timestamp is written. The value of the timestamp represents either the time the record was created or the time the record was last refreshed. In a preferred embodiment, by default, if the record is not dynamically updated, the timestamp equals zero. A zero value indicates that the timestamp is not to be refreshed and that the record is not to be scavenged.

After the record is refreshed, it cannot be refreshed again for the interval specified by the no-refresh interval, defined between t1 and t2. The no-refresh interval, a zone parameter, prevents unnecessary replication traffic between the servers primary for the zone. However, the record can still be updated during the no-refresh interval. If a dynamic update request requires modification to a record, the request is considered an update. If the request requires no modifications, it is considered a refresh, wherein an attempt is made to change the timestamp. During the no-refresh interval, refreshes to a record are not allowed by the present invention. Therefore, prerequisite-only updates, i.e. updates that include a list of prerequisites but no zone changes, are also considered refreshes and do not cause timestamp update during the no-refresh interval.

The no-refresh interval is followed by the refresh interval, defined between t2 and t3. After the expiration of the no-refresh interval, the server begins to accept refreshes, and the server continues to accept refreshes for the life span of the record. The record can be refreshed as long as the current time is greater than the value of the timestamp plus the no-refresh interval. When the server accepts a refresh or an update, the value of the timestamp changes to the current time, and the process begins at a new t1.

Next, after the expiration of the refresh interval, the DNS server can scavenge the record during scavenging if it has not been refreshed or updated. The record can be scavenged if the current time is greater than the value of the timestamp plus the value of the no-refresh interval plus the value of the refresh interval. However, the server does not necessarily scavenge the record at that time. The time at which records are scavenged depends on several server parameters, such as whether the server is enabled for scavenging and the scavenging period.

Figure 6:
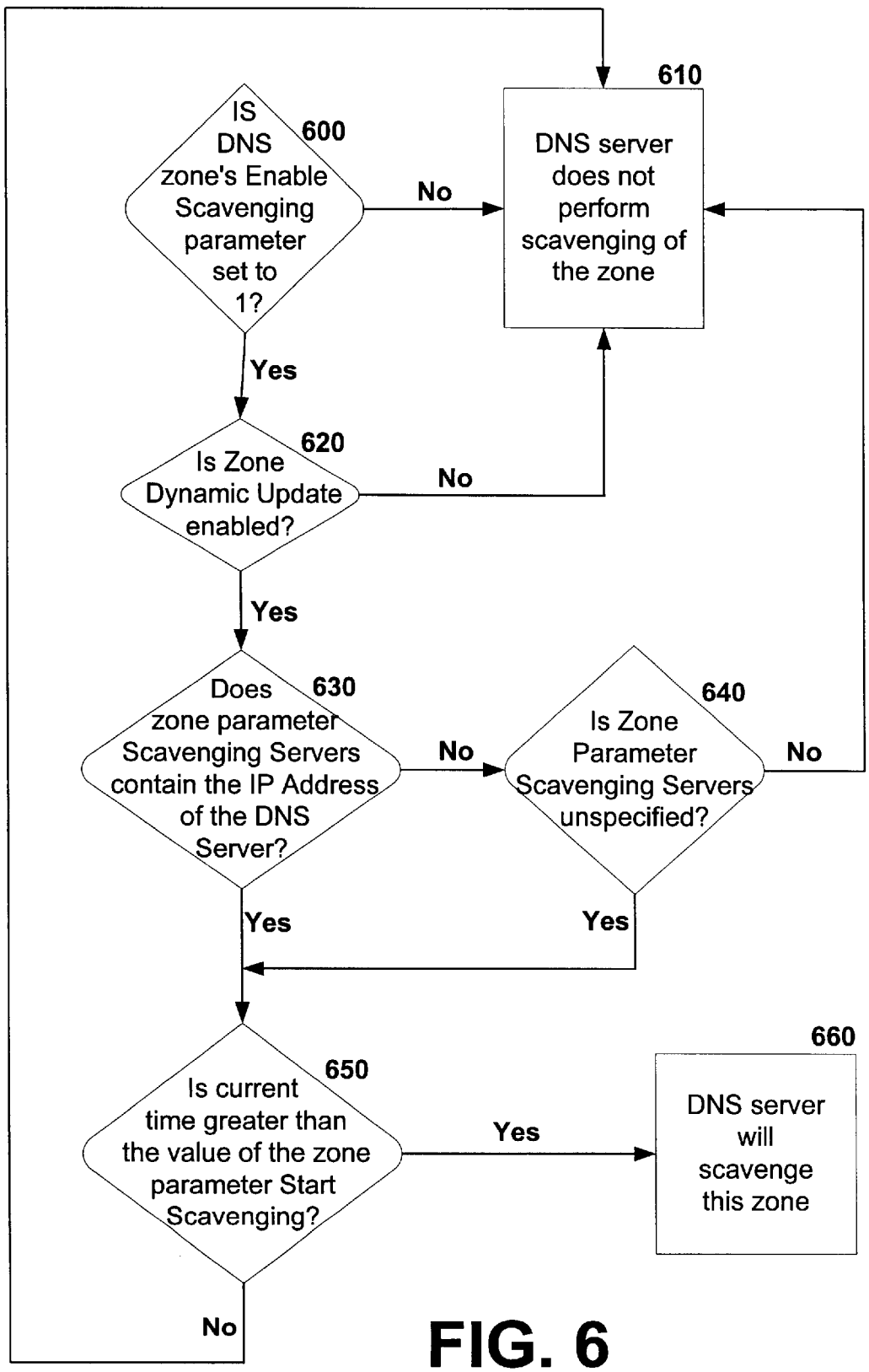
FIG. 6 illustrates an exemplary determination of whether a DNS server configured to perform scavenging may perform scavenging of a zone in accordance with the present invention.

A DNS server may be configured with the server parameters to perform scavenging automatically, using a fixed frequency. In addition, scavenging may be manually triggered on a DNS server to perform immediate scavenging. A DNS server will not attempt scavenging unless the DNS server's Enable Scavenging parameter is set to 1. If the DNS server's Enable Scavenging parameter is set to 1, the server periodically attempts to scavenge all primary zones. The server scavenges a zone if the zone's parameter Enable Scavenging is set to 1, Dynamic update is enabled on the zone, the zone parameter Scavenging Servers is not specified or contains the IP address of the server attempting to scavenge the zone and the current time is greater than the value of the zone parameter Start Scavenging. As illustrated in FIG. 6, at 600, if the zone's Enable Scavenging parameter is set to 1, a first hurdle to scavenging is overcome. At 620, it is determined whether the zone is enabled for Dynamic update functionality. If so, a second hurdle to scavenging is overcome. At 630 and 640, it is determined whether either the zone parameter Scavenging Servers contains the IP address of the DNS server or the zone parameter Scavenging Servers is unspecified. If either is the case, a third hurdle to scavenging is overcome. At 650, it is determined whether the current time is greater than the value of the zone parameter Start Scavenging. If so, a fourth hurdle is overcome, and the DNS server may perform scavenging on the zone at 660 in accordance with the present invention. If one or more of these hurdles is not overcome, the DNS server may not perform scavenging on the zone, and the flow proceeds to 610. The determinations made in 600 to 660 are shown in a specific order in FIG. 6; however, these determinations are not order specific, and thus these determinations may be made in an alternate order, or concurrently with other determinations.

All zone parameters that define whether scavenging is enabled for a specific zone are set by an administrator except Start Scavenging. The server sets the value of the zone's parameter Start Scavenging when at least one of the following occurs: dynamic update is turned on for the zone, when Enable Scavenging is set from 0 to 1 on the zone to be scavenged, the zone is loaded or the zone is resumed. Start Scavenging is then set equal to the time that one of the preceding events occurred plus the amount of time specified in the refresh interval for the zone. The Start Scavenging parameter is introduced to prevent a problem that may arise if the client is unable to refresh records because the zone isn't available which may happen, for example, if the zone is paused or if the server is inoperable. Without the utilization of the Start Scavenging parameter by the server, in these circumstances, the server can scavenge the zone before the client has a chance to update the record.

The zone specific parameter Scavenging Servers enables an administrator to specify a limited list of the DNS servers primary for this zone that may perform scavenging of the zone. If the parameter is not specified, then any server primary for a zone may attempt to perform scavenging of the zone. If the parameter value is set to a list of IP addresses, then only the DNS servers whose IP address(es) is (are) listed may attempt to perform scavenging of the zone.

Lastly, when the server is ready to scavenge a zone, it examines all the records in the zone one by one. If the timestamp of a record is not zero and the current time is later than the time specified in the timestamp plus the no-refresh interval plus the refresh interval for the zone, server deletes the record.

There are some issues to consider with respect to the configuration of the parameters defined in accordance with the present invention. For instance, to ensure that no records are deleted before a dynamic update client has time to refresh them, the refresh interval is set to be greater than the refresh period for each record within a zone. Many different services might refresh records at different intervals. For example, a first service might refresh records once an hour, DHCP servers might refresh records at the renewal of IP address leases, and still other computers might refresh their resource records every 24 hours. These examples are not to be construed as limiting the environments in which the invention may be applied, or as limiting values that may be assigned to parameters.

In general, the longer the no-refresh and refresh intervals, the longer stale records remain in the system. Therefore, these intervals may optimally be configured to be as short as is reasonable. However, if the no-refresh interval is configured to be too short, there may be unnecessary replication operations, since every time when the record's timestamp is updated it replicates to other primary for the zone DNS servers.

To decrease the number of the updates of the timestamp the following optimization is performed in accordance with the present invention. Since a zone will not be scavenged if the zone's Enable Scavenging parameter is not set to 1, the timestamps of the records in such a zone are not updated regardless of the interval (Refresh, or No refresh, or Scavenge) to which the record currently belongs. It is noted that if the record is created through the dynamic update, then the timestamp is set to the current server time when a record is created, even if the zone's Enable Scavenging parameter is not set to 1. This is performed to distinguish between the records that will be subject to scavenging, i.e. with a timestamp not equal to 0, from those that are not subject to scavenging, i.e. with a timestamp equal to 0, when scavenging is turned on for the zone.

Figure 7:
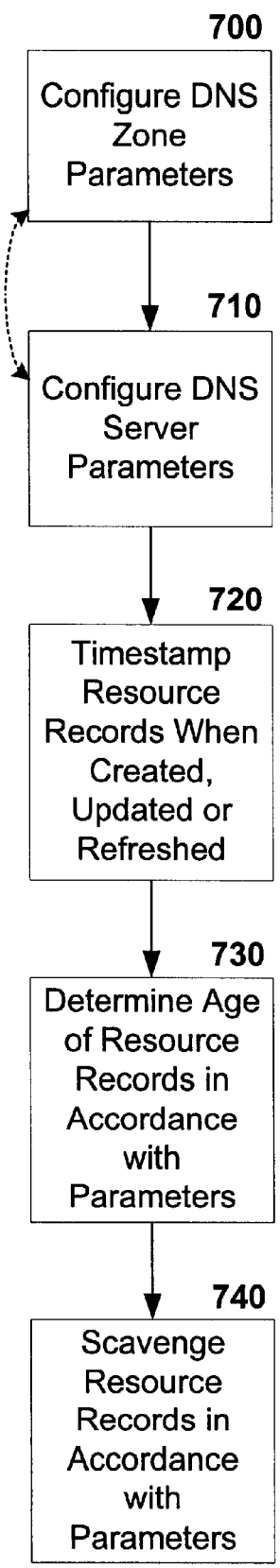
FIG. 7 is a flow diagram illustrating an exemplary process of configuring DNS server(s) and DNS database zone(s) in connection with the aging and scavenging of resource records in accordance with the present invention.

FIG. 7 is a flow chart illustrating the overall technique of aging and scavenging in accordance with the present invention. First, as shown in 700 and 710, the parameters for a zone to be scavenged and the parameters for a DNS server to perform scavenging are configured, which configuration may take place in any order, with or without default values depending upon the DNS system in consideration. Anytime a resource record is created, updated or refreshed, a timestamp is applied to the resource record at 720. Afterwards, a server authorized to scavenge a zone of a DNS database determines the age of an individual resource record at 730. At 740, the authorized DNS server determines whether to scavenge the resource record.

Figure 8:
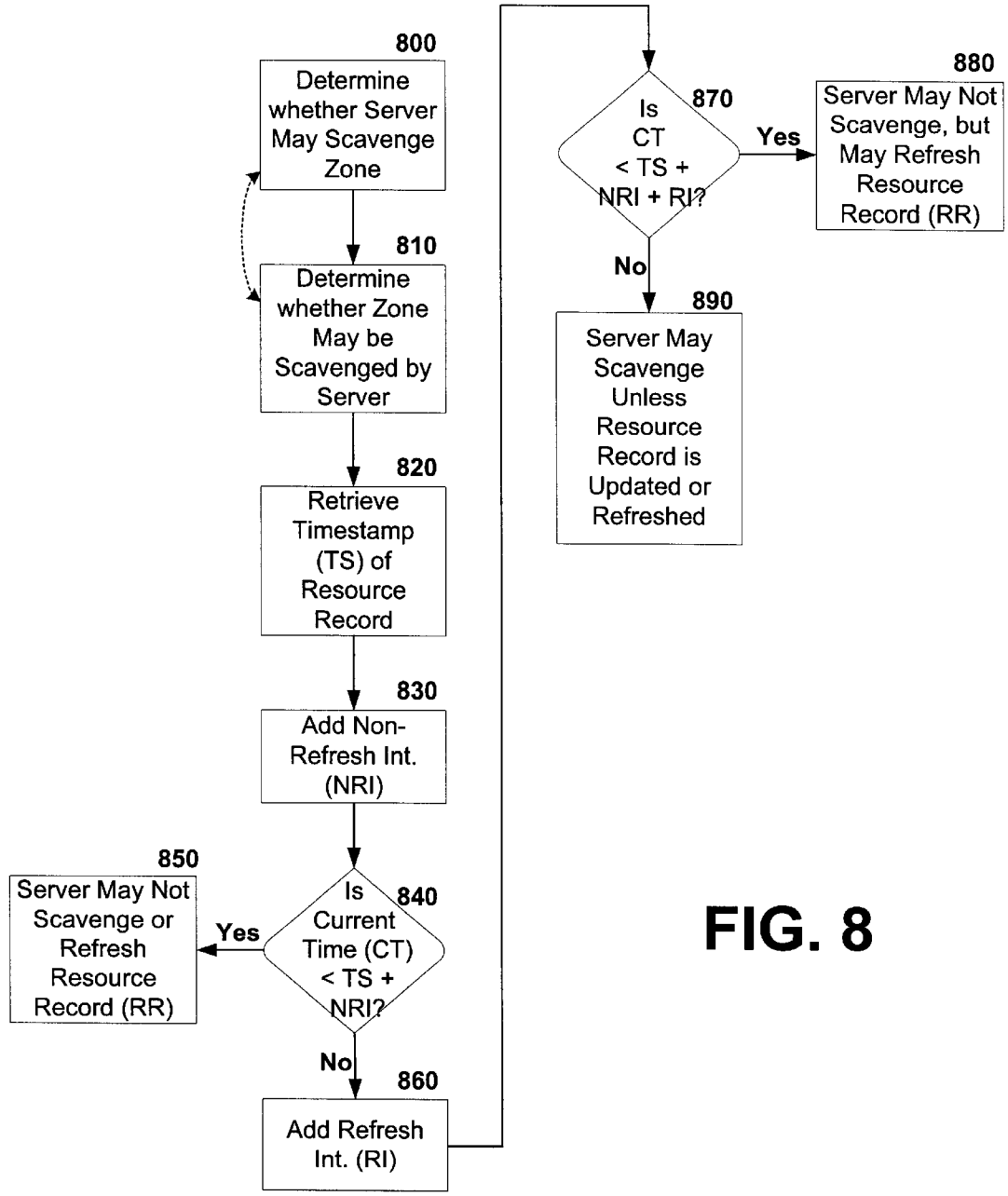
FIG. 8 is a flow diagram illustrating the exemplary operations in connection with the aging and scavenging of Resource Records in a DNS database with a DNS server in accordance with the present invention.

FIG. 8 illustrates, among other processes, exemplary processes of determining the age of a resource record and determining based on the age what privileges a scavenging server has in relation to the resource record. First, at 800 and 810 (interchangeable), it is determined whether a server is authorized to perform scavenging of the zone based upon the configuration of the server and zone, respectively, in accordance with the parameters described above. At 820, for a given resource record in the scavengable zone, the timestamp is retrieved. At 830, the non-refresh interval is added to the timestamp. At 840, it is determined whether the current time is less than the non-refresh interval plus the timestamp. If so, then at 850, although the resource record may be updated, the resource record may not be refreshed or scavenged. If not, then at 860, the refresh interval is further added to the addition of the timestamp and the non-refresh interval. At 870, it is determined whether the current time is less than the timestamp plus the non-refresh interval plus the refresh interval, but greater than the timestamp plus the non-refresh interval. If so, at 880, then the resource record may be updated or refreshed, but not scavenged. If the current time is greater than the timestamp plus the non-refresh interval plus the refresh interval, at 890, then the resource record is in the scavengable interval, in which the resource record may be scavenged when the DNS server attempts to scavenge the resource record according to the configured parameters. Otherwise, if at anytime during the above process (except where prohibited) a resource record is refreshed or updated, then a new timestamp is applied whereafter the flow may return to 820.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of a server offering Domain Name Services (DNS) that resolves requests for an application or computer system into an address of a physical machine, such as a network server. One skilled in the art will recognize that the present invention is not limited to the use of DNS and may be readily adapted to other applications and services using a directory lookup, network name service or other method of satisfying network service or locator requests. Additionally, while the present invention may be implemented in the context of an Active Directory service, the present invention may be implemented in connection with records that are stored in any format and storage location(s). Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for aging and scavenging domain name service (DNS) resource records in a DNS database, comprising:

configuring at least one DNS server and at least one zone in a DNS database with parameters for performing aging and scavenging according to predefined temporal intervals;

adding a timestamp to at least one resource record in said at least one configured zone when said at least one resource record is one of created, updated and refreshed;

determining the age of said at least one resource record;

determining in accordance with said determined age to which predefined temporal interval of a plurality of temporal intervals defined by said parameters said resource record belongs; and scavenging said at least one resource record in said at least one zone with said at least one DNS server at a scavenging time determined by said parameters, if said at least one resource record's age is such that the temporal interval to which said at least one resource record belongs is a temporal interval that permits scavenging as determined by said parameters.

2. A method according to claim 1, wherein said plurality of temporal intervals include a scavenging servers parameter that defines which servers may perform said scavenging.

3. A method according to claim 1, wherein said plurality of temporal intervals include a start scavenging parameter that defines a time delay before said scavenging so that all entities refreshing DNS records have a preset amount of time to refresh the records.

4. A method according to claim 1, wherein said plurality of temporal intervals include a non-refresh interval, immediately following said timestamp, during which an associated resource record may neither be refreshed nor scavenged.

5. A method according to claim 4, wherein said plurality of temporal intervals include a refresh interval, immediately following said non-refresh interval, during which an associated resource record may be refreshed, but not scavenged.

6. A method according to claim 1, wherein said plurality of temporal intervals include a scavenging interval, during which an associated resource record may be scavenged at a scavenging time defined by said parameters.

7. A method according to claim 6, wherein if a resource record associated with the scavenging interval is one of refreshed and updated, a new timestamp is applied to the resource record and aging of the resource record begins anew.

8. A method according to claim 6, wherein the scavenging interval for an associated resource record is ended upon one of refreshing, updating, and scavenging of said associated resource record.

9. A method according to claim 1, wherein at least one of said parameters defines how often said at least one DNS server may scavenge said at least one zone.

10. A method according to claim 4, wherein at least one of said parameters defines the length of said non-refresh interval.

11. A method according to claim 5, wherein at least one of said parameters defines the length of said refresh interval.

12. A method according to claim 6, wherein at least one of said parameters defines the starting time of the scavenging interval.

13. A method according to claim 1, wherein a request from a client computer may cause said DNS server to perform one of creating, updating and refreshing of a resource record in said at least one zone.

14. A method according to claim 1, wherein said parameters and plurality of temporal intervals are set to default values.

15. A computer-readable medium having computer-executable instructions for instructing a computer to perform the method recited in claim 1.

16. A plurality of data structures stored on computer-readable media associated with at least one zone of a DNS database and at least one DNS server in connection with which the method of claim 1 is performed, having parameters that define a non-refresh interval, a refresh interval and a scavenging period.

17. A modulated data signal for carrying information that encodes one of said plurality of data structures as recited in claim 16.

18. A computer system for performing aging and scavenging of domain name service (DNS) resource records, comprising:
    at least one DNS server;
    at least one zone of at least one DNS database;
    a network connection to at least one client computer;
    wherein at least one resource record in said at least one zone is given a timestamp when it is one of created, refreshed and updated, wherein parameters are configured for said at least one DNS server and said at least one zone that enable a determination of the age of at least one resource record in said at least one zone and a determination of to which of a plurality of time intervals said at least one resource record belongs, and wherein if said age is such that said at least one resource record belongs to a scavenging interval, said at least one resource record may be scavenged by said at least one DNS server at a scavenging time also defined by said parameters.

19. A computer system according to claim 18, wherein said plurality of time intervals include a scavenging servers parameter that defines which servers may perform said scavenging.

20. A computer system according to claim 18, wherein said plurality of time intervals include a start scavenging parameter that defines a time delay before said scavenging so that all entities refreshing DNS records have a preset amount of time to refresh the records.

21. A computer system according to claim 18, wherein said plurality of time intervals include a non-refresh interval, immediately following said timestamp, during which an associated resource record may neither be refreshed nor scavenged.

22. A computer system according to claim 21, wherein said plurality of time intervals include a refresh interval, immediately following said non-refresh interval, during which an associated resource record may be refreshed, but not scavenged.

23. A computer system according to claim 18, wherein if a resource record associated with the scavenging interval is refreshed or updated, a new timestamp is applied to the resource record and aging of the resource record begins anew.

24. A computer system according to claim 18, wherein the scavenging interval for an associated resource record is ended upon one of refreshing, updating, and scavenging of said associated resource record.

25. A computer system according to claim 18, wherein at least one of said parameters defines how often said at least one DNS server may scavenge said at least one zone.

26. A computer system according to claim 21, wherein at least one of said parameters defines the length of said non-refresh interval.

27. A computer system according to claim 22, wherein at least one of said parameters defines the length of said refresh interval.

28. A computer system according to claim 18, wherein at least one of said parameters defines the starting time of the scavenging interval.

29. A computer system according to claim 18, wherein a request from a client computer over said network connection causes said DNS server to perform one of creating, updating and refreshing of a resource record in said at least one zone.

30. A computer system according to claim 18, wherein said parameters and said plurality of time intervals include default values.

31. A method for determining whether to scavenge a resource record in a domain name service (DNS) database at a scavenging time, including:
    retrieving the timestamp of the resource record in the DNS database;
    adding a non-refresh interval to the timestamp to produce a first result;
    adding a refresh interval to the first result to produce a second result; and
    determining whether the current time is greater than the second result,
    wherein if the current time is greater than the second result, the resource record is scavenged.

32. A method according to claim 31, further including:
    determining whether the current time is greater than the first result but less than the second result,
    wherein if the current time is greater than the first result but less than the second result, the resource record may be one of refreshed and updated, but not scavenged.

33. A method according to claim 31, further including:
    determining whether the current time is greater than the timestamp but less than the first result,
    wherein if the current time is greater than the timestamp but less than the first result, the resource record may be updated, but the resource record may not be scavenged and the resource record may not be refreshed.

34. A method according to claim 31, wherein the non-refresh interval and the refresh interval are assigned default values.

* * * * *